United States Patent [19]
Morris et al.

[11] Patent Number: 5,590,736
[45] Date of Patent: Jan. 7, 1997

[54] VEHICLE PNEUMATIC SEAT ROLLOVER SAFETY VENT VALVE

[75] Inventors: John M. Morris, Auburn; Andrew F. Thompson, Seattle, both of Wash.

[73] Assignee: GT Development Corporation, Seattle, Wash.

[21] Appl. No.: 525,822

[22] Filed: Sep. 8, 1995

[51] Int. Cl.$^6$ .................................................. B60R 21/13
[52] U.S. Cl. .............................. 180/282; 137/38; 137/43; 248/631; 267/131
[58] Field of Search ................................ 180/282; 137/38, 137/43; 248/631; 297/516.1, DIG. 8; 267/131; 296/68.1

[56] References Cited

U.S. PATENT DOCUMENTS

| | | | |
|---|---|---|---|
| 406,290 | 7/1889 | Murdock | 137/38 |
| 535,556 | 3/1895 | Robinson | 137/38 |
| 2,239,098 | 4/1941 | Hunter | 137/38 |
| 2,262,746 | 11/1941 | Allen | 137/43 |
| 2,461,304 | 2/1949 | Wilson | 137/38 |
| 2,770,666 | 11/1956 | Knight | 137/43 |
| 3,100,495 | 8/1963 | Boler et al. | 137/38 |
| 3,106,203 | 10/1963 | Mayo et al. | 137/38 |
| 3,298,654 | 1/1967 | Dome | 248/631 |
| 3,389,715 | 6/1968 | Hebard et al. | 137/43 |
| 3,521,652 | 7/1970 | Reeks | 137/38 |
| 3,994,360 | 11/1976 | Leibold | 180/282 |
| 4,392,507 | 7/1983 | Harris | 137/38 |
| 4,514,010 | 4/1985 | Sabater Gonzalez | 297/284.1 |
| 4,565,208 | 1/1986 | Ritchie et al. | 137/38 |
| 4,655,238 | 4/1987 | Szlaga | 137/43 |
| 4,878,511 | 11/1989 | Fox | 137/38 |
| 4,938,528 | 7/1990 | Scott | 297/284.6 |
| 4,966,410 | 10/1990 | Bishai | 297/284.1 |
| 5,005,904 | 4/1991 | Clemens et al. | 297/284.6 |
| 5,234,203 | 8/1993 | Smith | 248/631 |
| 5,242,072 | 9/1993 | Koebernik | 137/43 |

FOREIGN PATENT DOCUMENTS

| | | | |
|---|---|---|---|
| 893280 | 4/1962 | United Kingdom | 137/43 |
| 970678 | 9/1964 | United Kingdom | 137/38 |

*Primary Examiner*—Brian L. Johnson
*Assistant Examiner*—Peter C. English
*Attorney, Agent, or Firm*—Christensen O'Connor Johnson & Kindness PLLC

[57] ABSTRACT

A rollover vent valve for use in a pneumatic seat mounted in a vehicle. The rollover vent valve allows air to vent from the air bag(s) in the pneumatic seat in the event the vehicle in which the seat is mounted is severely tilted or overturned. The rollover vent valve includes a housing enclosing a pressure chamber and a valve member. The interior of the pressure chamber is in fluid connection with the air bag(s). The rollover vent valve also includes a vent port that connects the interior of the chamber to the ambient environment. The valve member is located within the pressure chamber above the vent port and forms a seal with the vent port when the pneumatic seat in which the valve is mounted is in an upright position. The valve member includes a weight cage in which a spherical weight is movably mounted. One end of the weight cage includes a valve seal that forms a seal on the valve seat of the vent port. When the pneumatic seat in which the valve is mounted is located in an upright position, the weight provides a biasing force to maintain the valve member and valve seal in a normally closed and sealed position. When the valve is tilted or overturned, the spherical weight moves within the weight cage to move the valve member and valve seat off of the vent port, thus opening the vent port. Opening the vent port connects the interior of the air bag(s) with the ambient environment thus allowing the air bag(s) to deflate.

21 Claims, 5 Drawing Sheets

VEHICLE PNEUMATIC SEAT ROLLOVER SAFETY VENT VALVE

TECHNICAL AREA

The present invention is directed to pneumatic seats for vehicles and, more particularly, to mechanisms for releasing or venting air from the air bag(s) of the pneumatic seats.

BACKGROUND OF THE INVENTION

In order to increase comfort, in recent years pneumatic seats have been developed for use in vehicles, such as long-haul trucks. Pneumatic seats comprise a pedestal that includes one or more air bag(s), a seat supported by the pedestal and a control valve for controlling the volume of the air within the air bag(s). Pneumatic seats are particularly advantageous in vehicles that are driven for extended periods of time. Because the volume and pressure of air in the air bag(s) controls the height of the driver's seat, pneumatic seats can be used to adjust seat height to suit the driver's preferences. In addition, the pressure within the air bag(s) can be adjusted to help isolate the driver from vibration and bouncing when compared to non-pneumatic seats. Isolating the driver from such vibrations and bouncing reduces the occurrence of medical injuries and lumbar pain. Simply put, the air bag(s) pedestal functions as a shock absorber that absorbs the vibration and bouncing that would normally be transferred to the driver in non-pneumatic seats.

One concern of pneumatic seats has recently been identified. In severe accidents in which a vehicle with pneumatic seats tilts severely or rolls over, a pneumatic seat may pin its occupant against the roof or other areas of the vehicle. When a vehicle is severely tilted or rolls over, the weight of the occupant and seat is removed from the air bag(s) pedestal. The pressure within the air bag(s) pedestal then causes the air bag(s) to expand, possibly pinning the occupant of the seat against the roof or other area of the vehicle. Rescue personnel are often unfamiliar with the operation of pneumatic seat control systems. Therefore, an expanding air bag(s) pedestal can hinder rescue operations.

The disadvantages of pneumatic seats in rollover type accidents has led to a need for a device that automatically releases air pressure in the pneumatic seat in the case of a rollover. The present invention is directed towards fulfilling this need.

SUMMARY OF THE INVENTION

In accordance with the invention, a mechanism for venting air from the air bag(s) of pneumatic seats mounted in a vehicle if the vehicle is tilted or overturned is provided. The mechanism includes a rollover vent valve mounted in the vehicle and coupled to the air bag(s) of the pneumatic seats. The rollover vent valve is designed such that a vent port is closed as long as the vehicle remains substantially upright. If the vehicle tilts substantially or is overturned, the vent port is opened, allowing air to escape from the air bag(s).

In one embodiment of the invention, the rollover vent valve includes a pressure chamber having a vent port formed in the pressure chamber and a vent valve for normally closing the exhaust port. The vent valve includes a weight container having a valve seal and a weight movably mounted within the container. The valve seal contacts and seals the vent port when the vent valve is in a normally closed position in which the weight places a biasing force on the valve seal to maintain the vent valve in the normally closed position. When the vent valve is tilted or overturned, the weight within the container moves, causing the valve seal to move off of the vent port, thus opening the vent port and allowing air to flow out of the air bag(s).

In accordance with other aspects of the invention, the container is located within the pressure chamber directly above the vent port when the vent valve is in a normally closed position. The container includes a plurality of deformable fingers that deform to allow the weight to be removably inserted into the container. The vent valve further includes a plurality of ribs that extend radially inward from the sides of the pressure chamber to contact and support the container and weight when the vent valve is in a normally closed position.

In accordance with other aspects of the invention, the interior of the container is generally cylindrical and the weight is spherical. When tilted beyond a predetermined angle, the weight moves within the container causing the container to move out of its supporting relationship with the ribs so that the valve seal is moved off of the vent port. When the rollover vent valve is moved back to an upright position, the weight moves within the container to move the container and valve seal back into a sealing position on the vent port.

As will be readily appreciated from the foregoing summary, the invention provides an uncomplicated, reliable mechanism for automatically venting or releasing air from the air bag(s) that support pneumatic seats when the vehicle in which the seats are mounted is severely tilted or overturned. Because air is automatically vented from the air bag(s), it is easier for rescue personnel to remove injured occupants from vehicles that have been severely tilted or overturned during an accident. In essence, when a vehicle containing an embodiment of the invention is tilted or overturned, the rollover vent valve is tilted or overturned. When the rollover vent valve is tilted or overturned, the valve opens and releases air from the air bag(s) of the pneumatic seat(s) mounted in the vehicle.

When the vehicle is returned to its upright condition, the seats and, thus, rollover vent valve are also returned to their upright position. As the rollover vent valve is returned to its upright position, the rollover vent valve automatically moves back into its normally closed position, thus eliminating the need to replace or reset the rollover vent valve.

The configuration of the present invention allows a relatively large vent port in relation to spherical weight to be used, thus allowing the air bag(s) to be quickly vented in the case of severe tilting or vehicle rollover. The invention achieves a robust, highly reliable rollover vent valve, thus achieving significant advantages over the prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
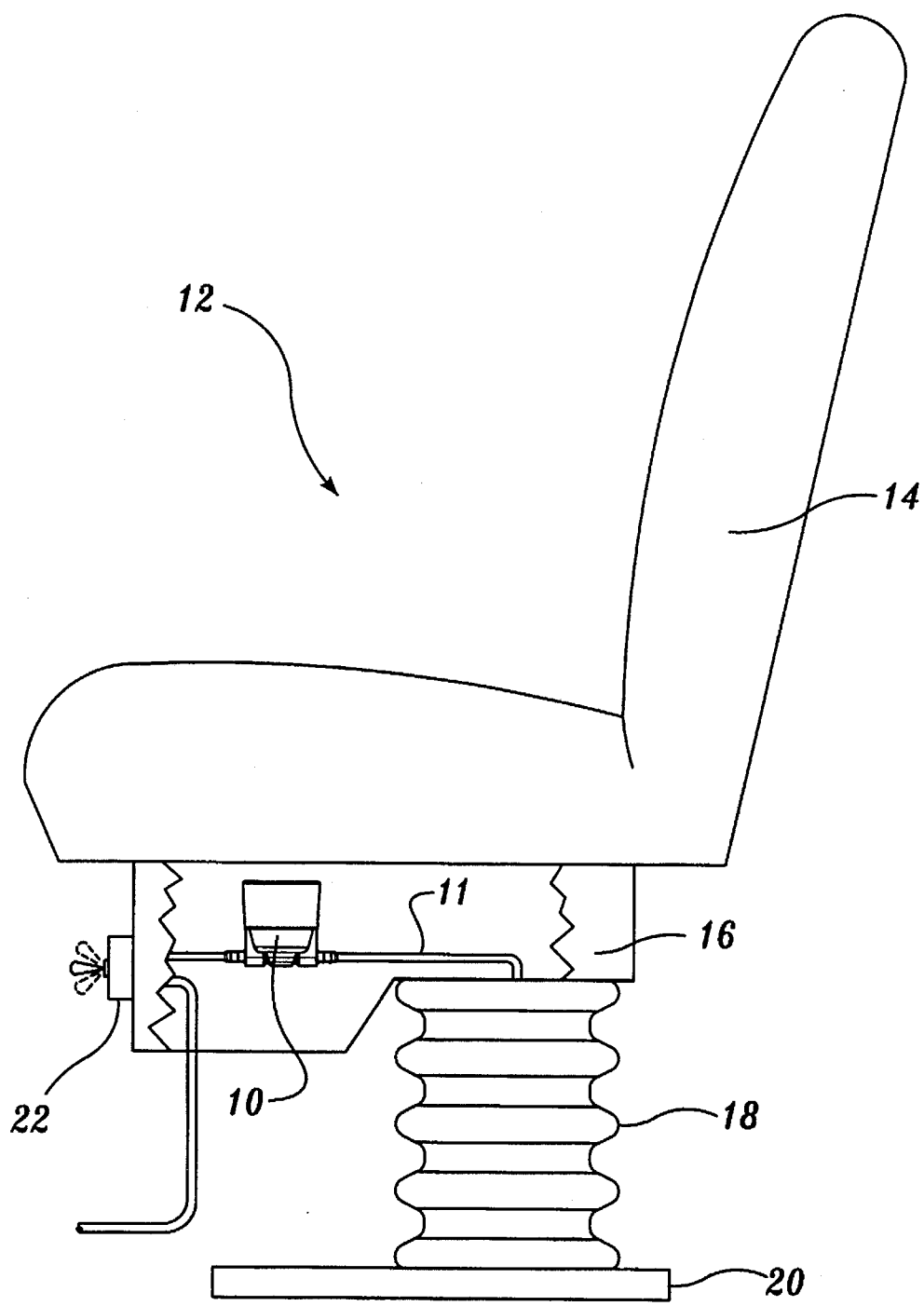
FIG. 1 is a pictorial diagram of a pneumatic seat that includes a rollover vent valve formed in accordance with the present invention.

FIG. 1 is a pictorial diagram illustrating a rollover vent valve 10 formed in accordance with the invention. The rollover vent valve 10 is mounted in the air pressure line 11 of a pneumatic seat 12. The pneumatic seat 12 is of the type commonly used in long-haul vehicles, such as trucks. Such pneumatic seats generally include a seat 14 that is supported by a frame 16. The frame is in turn positioned atop a pedestal formed by one or more air bag(s) 18. The opposite end of the air bag(s) 18 are mounted upon a seat base 20 that is in turn affixed to the floor of the truck.

A pneumatic source (not shown) supplies pressurized air to the air bag(s) 18 via a control valve 22. The control valve manually controls the amount and thus pressure of air within the air bag(s) 18 by connecting the source of compressed air to the air bag(s) or by connecting the air bag(s) to an exhaust outlet (not shown). The volume and pressure of air within the air bag(s) 18 controls the expansion and contraction of the air bag(s), and thus, the height of the pneumatic seat 12.

The invention improves on pneumatic seats of the type shown in FIG. 1 by adding a rollover vent valve 10 that releases air from the air bag(s) 18 in the event the vehicle within which the pneumatic seat is located overturns, or is severely tilted beyond a predetermined angle. In the preferred embodiment, the rollover vent valve 10 is connected between the control valve 22 and the air bag(s) 18. The rollover vent valve 10 is designed to connect the air bag(s) 18 to ambient pressure in the event that the vehicle in which the rollover valve is located is severely tilted or flipped over.

FIG. 1 illustrates the presently preferred location for the rollover vent vane 10, i.e. in the line between the control valve 22 and the air bag(s) 18. However, the rollover vent valve 10 can be connected to the air bag(s) 18 in a different manner. For example, the rollover vent valve can be connected to the air bag(s) 18 via a separate conduit as described below.

FIGS. 2–6 illustrate the presently preferred embodiment of a rollover vent valve 10 suitable for releasing air from the air bag(s) 18 in the event of severe tilting or rollover. The rollover vent valve 10 includes a housing 30, inlet and outlet air fittings 32 and 34 respectively, a sealing cap 36 and a valve member 38. The valve member 38 includes a container or weight cage 40, a valve seal 42, a biasing spring 44, a retaining ring 46 and a spherical valve weight 48.

Figure 2:
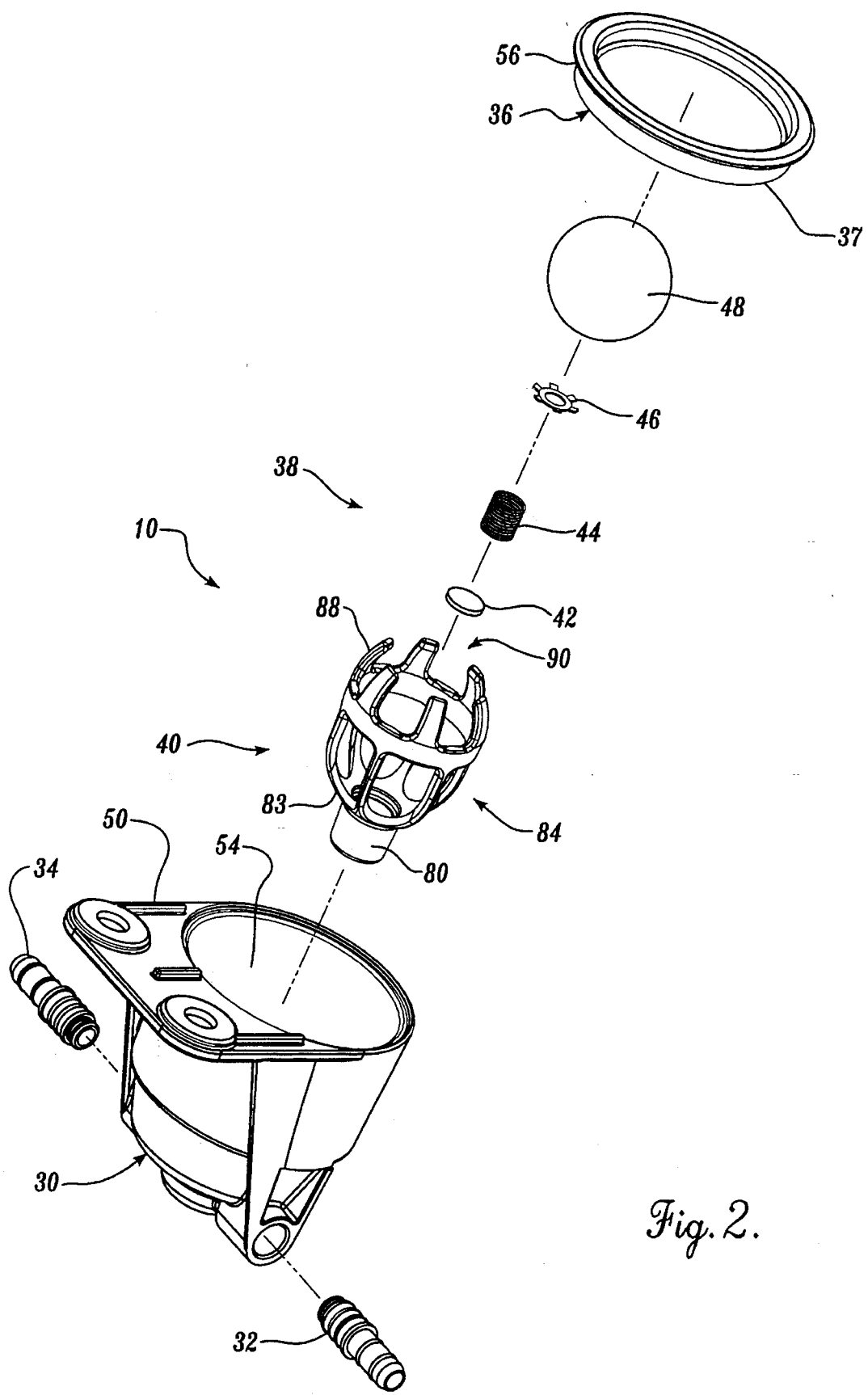
FIG. 2 is an exploded view of a preferred embodiment of a rollover vent valve of the invention.
Figure 3:
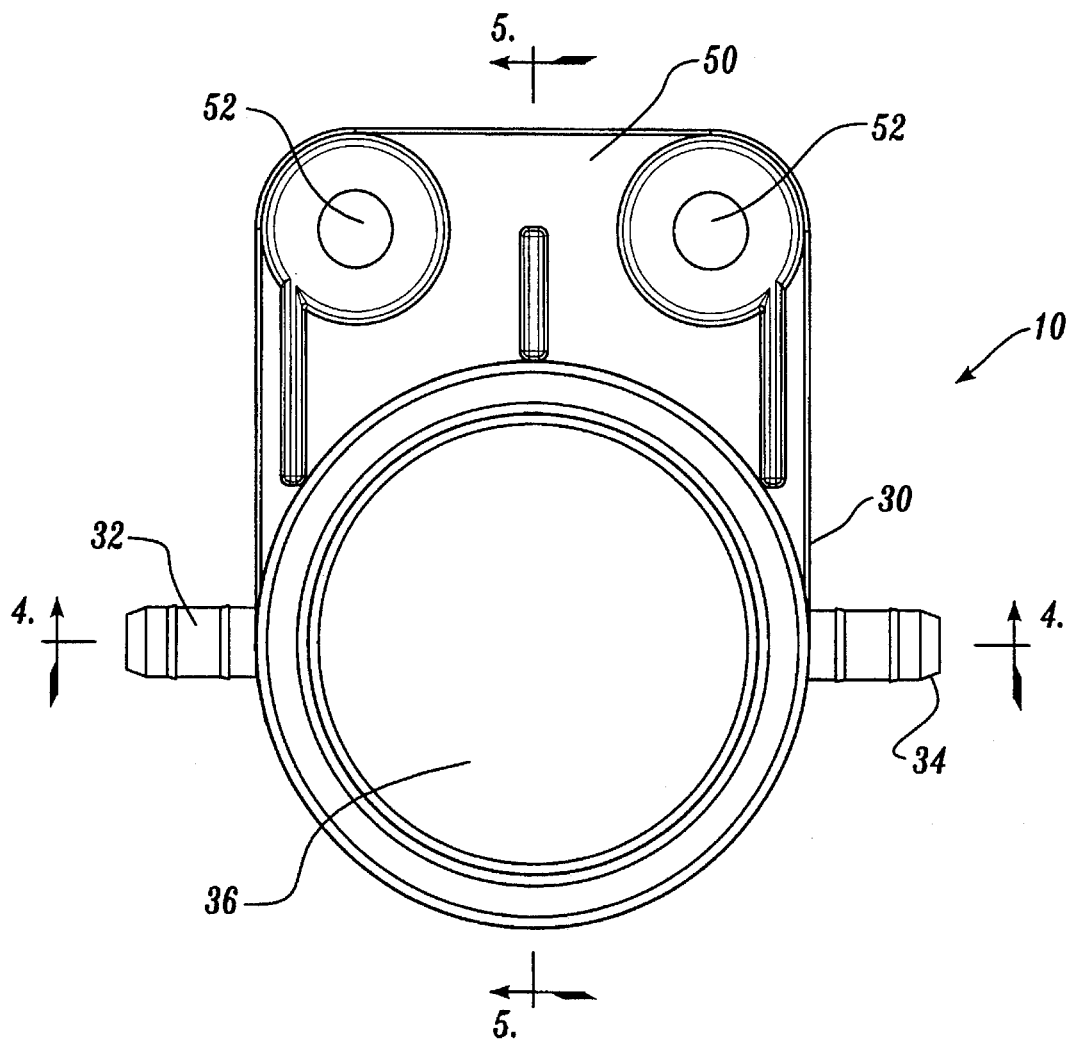
FIG. 3 is a top view of the rollover vent valve of FIG. 2.
Figure 6:
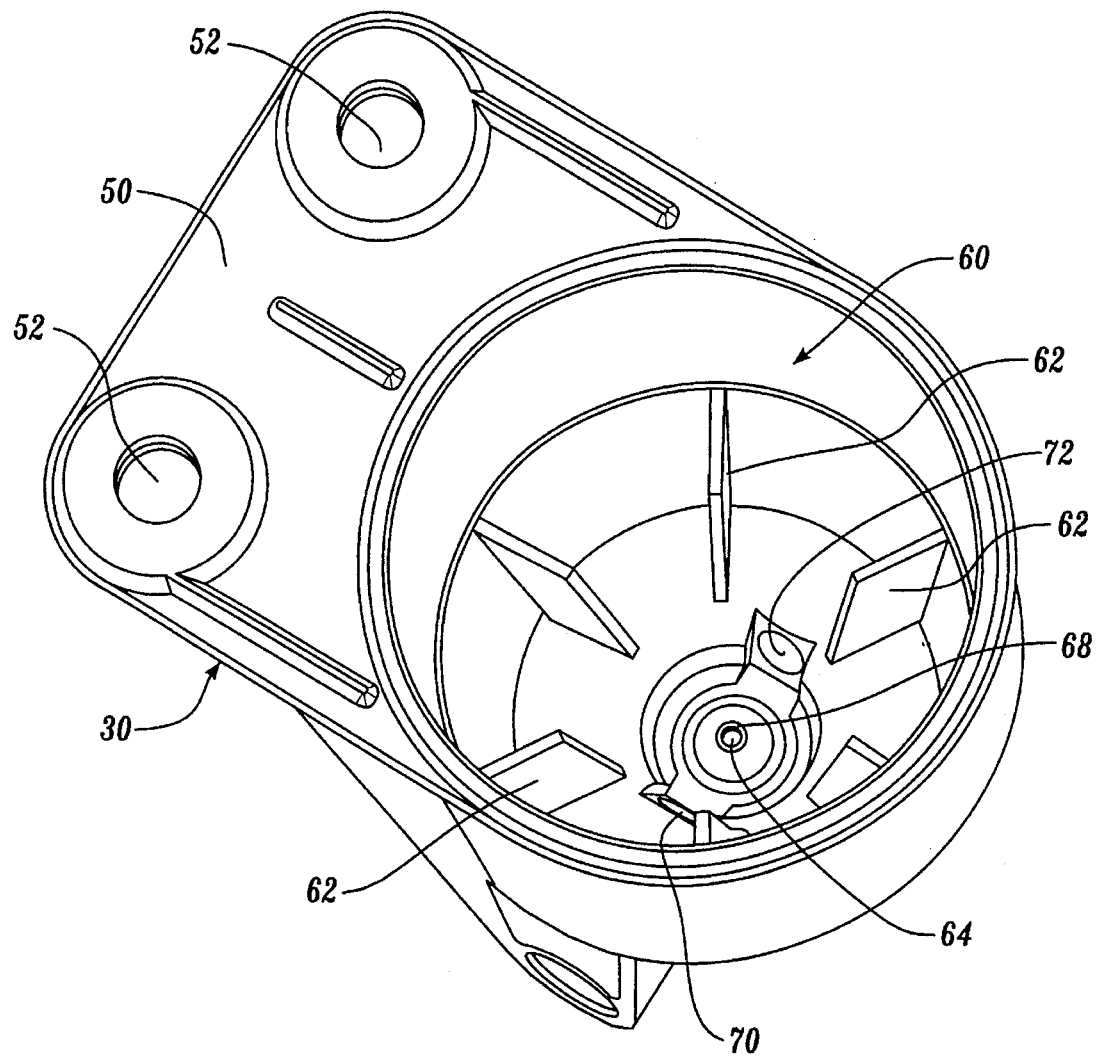
FIG. 6 is a perspective view of the interior chamber of the rollover vent valve.

As best seen in FIGS. 2 and 6, the housing 30 includes a rectangular flange 50 that extends outward from one side of the top of the housing. The rectangular flange 50 includes two reinforced mounting holes 52 that are used to mount the rollover vent valve 10 to the frame 16. Fasteners (not shown), such as bolts, extend through the holes 52 and are received in receptacles (not shown) in the frame 16.

As best shown in FIGS. 2 and 6, the housing 30 is hollow and has an internal pressure cavity or chamber 60 and a cylindrical top opening 54. The cap 36 (FIGS. 2 and 4) is also cylindrical and is sized to be partially received within and seal the top opening 54. The lower portion 37 of the sealing cap 36 extends downward into the top opening 54 and a shoulder 56 (FIGS. 4 and 5) contacts and forms a seal with an upper peripheral edge of the housing 30.

Figure 4:
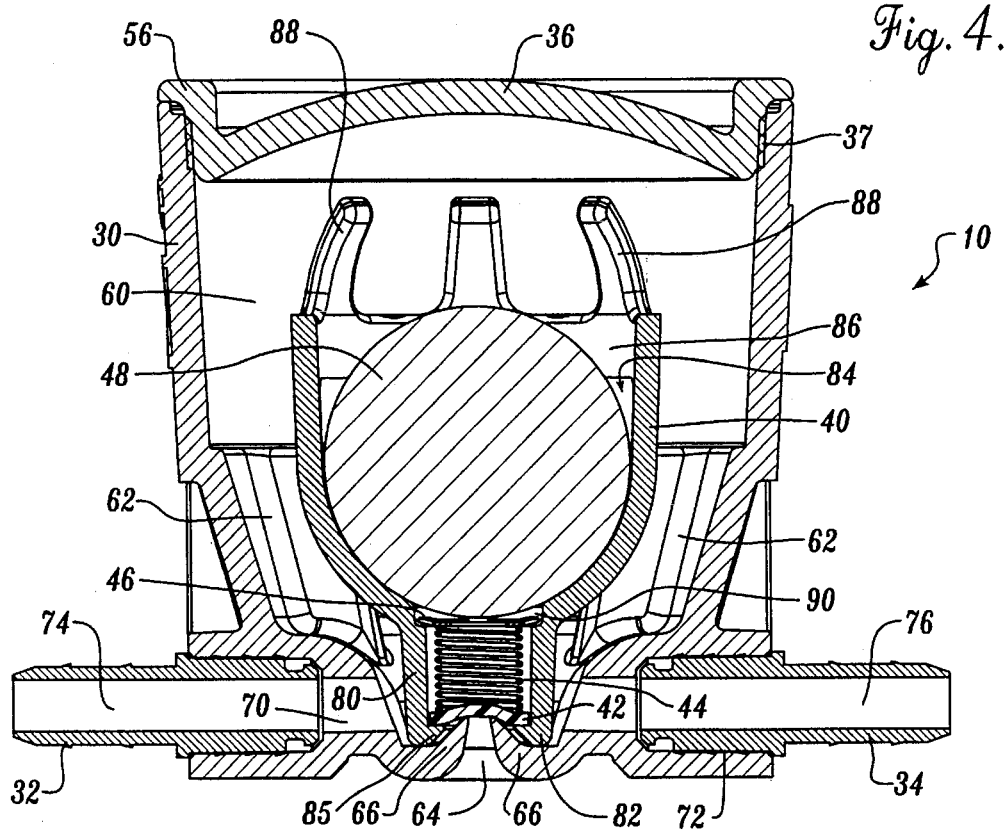
FIG. 4 is a cross-sectional view of the rollover vent valve taken along line 4—4 of FIG. 3.

The housing 30 and sealing cap 36 together form the internal pressure chamber 60. The upper portion of the pressure chamber 60 is generally cylindrical and the lower portion of the pressure chamber 60 is conical. The walls of the conical lower portion pressure chamber slope downward and inward as best illustrated in FIGS. 4 and 6. The conical lower portion of the pressure chamber 60 includes a plurality of support ribs 62 that extend radially inward from the walls of the pressure chamber 60. The support ribs 62 support the valve member 38 when the rollover vent valve is in an upright position as described in detail below.

A vent port 64 forms a passageway from the interior of the pressure chamber 60 through the bottom of the housing 30 to the exterior of the rollover vent valve 10. The lip 66 (FIG. 4) of the vent port 64 curves upward into the pressure chamber 60 to form a cylindrical valve seat 68 (FIG. 6).

The inlet and outlet air fittings 32 and 34, respectively, are press fit into cylindrical cavities 70 and 72, respectively, in the housing 30. The cavities 70 and 72 extend through the bottom portion of the housing 30 into the internal pressure chamber 60. The inlet air fitting 32 is hollow and establishes an inlet air passageway 74 into the internal pressure chamber 60. Similarly, the outlet air fitting 34 is also hollow and establishes an outlet air passageway 76 that is also in fluid connection with the internal pressure chamber 60. The inlet air fitting 32 is connected by an air line to the control valve 22 and the outlet air fitting 34 is connected to the air bag(s) 18 by air pressure line 11.

The valve member 38, including weight cage 40, valve seal 42, biasing spring 44, retaining ting 46, and spherical weight 48 are mounted within the internal pressure chamber 60. The weight cage 40 includes a lower cylindrical portion 80 (FIG. 4) that is sized to fit within the bottom of the lower conical portion of the internal pressure chamber 60. The lower edge of the cylindrical portion 80 includes a rounded cylindrical peripheral edge 82 (FIG. 4) that is sized to fit over the cylindrical lip 66 of the vent port 64.

A plurality of ribs 83 (FIG. 2) arch radially upward and outward from the top of the cylindrical portion 80 to form a basket 84. The upper end of each of the ribs 83 is attached to a cylindrical band 86. A plurality of deformable fingers 88 arch radially inward and upward from the top of the band 86. The fingers 88 arch only partially inward, thus forming a cylindrical opening 90 (FIG. 2) at the top of the cage 40. The fingers 88 are formed of deformable material and the opening 90 is sized so that the spherical weight 48 can be pressed into and captured within the interior of the cage 40. As the spherical weight 48 is pressed through the opening 90, the fingers 88 deform slightly outward allowing the spherical weight to be pressed into the interior of the cage 40. Once the spherical weight 48 is captured, the fingers 88 return to their undeformed state and maintain the spherical weight within the cage 40.

The valve seal 42 is generally a flat cylindrical disc and is sized to be placed within the interior of the cylindrical portion 80 of the cage 40. The valve seal 42 rests upon the upper surface of a shoulder 85, formed by the inner edge of the cylindrical peripheral edge 82. The valve seal 42 is formed of a deformable sealing material to allow it to form a seal on the valve seat 68 as described below.

A cylindrical biasing spring 44 is placed on top of the valve seal 42 and extends upward approximately to the top of the cylindrical portion 80. The retaining ring 46 is located on top of the biasing spring 44 within the interior of the cylindrical portion 80. The upper edge of the interior of the cylindrical portion 80 includes a peripheral shoulder or recess 90 (FIG. 4). The retaining ring 46 is press fit into the recess 90 in order to maintain the biasing spring 44 and valve seal 42 in place in the cylindrical portion 80. The biasing spring 44 is of a sufficient length to produce a biasing force that biases the valve seal 42 into contact with the upper surface of the shoulder 85. The spherical weight 48 is located within the cage 40 and rests on the bottom of the ribs 83 of the basket 84 and the top of the retaining ring 46 when the rollover vent valve 10 is in an upright position as shown in FIG. 4.

When the rollover vent valve 10 is assembled and upright, the valve member 38 is located within the internal pressure chamber 60 so that the cylindrical portion 80 of the cage 40 fits over the cylindrical lip 66 of the vent port 64. In this position, the rollover vent valve 10 is in a normally closed position in which the valve seal 42 rests upon and seals the valve seat 68. In the normally dosed position, air passes into the internal pressure chamber 60 through the inlet passageway 74 and out of the internal pressure chamber through the outlet passageway 76. Thus, in the normally closed position, pressurized air from the control valve 22 passes through the rollover vent valve 10 and into the air bag(s) 18, thus maintaining the air bag(s) inflated.

Figure 5:
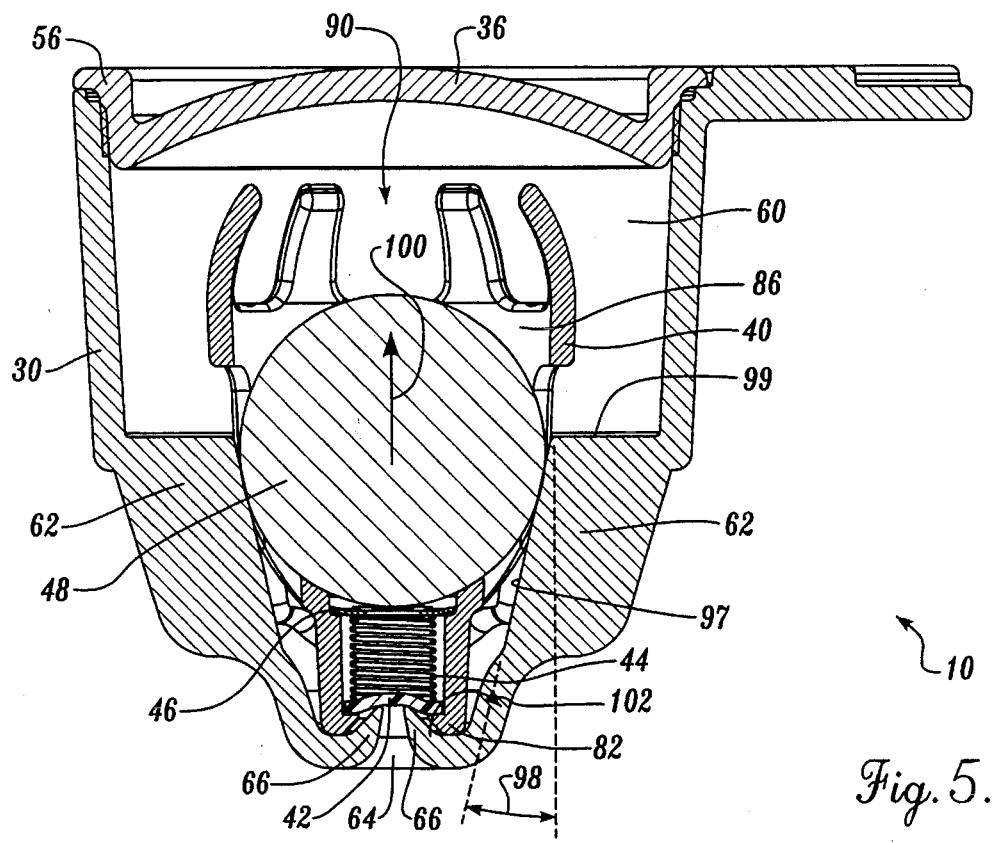
FIG. 5 is a cross-sectional view of the rollover vent valve taken along line 5—5 of FIG. 3.

The rollover vent valve 10 is maintained in its normally dosed position as long as the rollover vent valve is maintained in an upright position as illustrated in FIGS. 4 and 5. As discussed in the background section, it is important that the rollover vent valve 10 move from its normally closed position to an open position when the vehicle in which the pneumatic seat 12 is mounted is severely tilted or rolled over. In its open position, the rollover vent valve 10 allows air from within the internal pressure chamber 60 and, thus, air from within the air bag(s) 18 to vent through the vent port 64 as discussed in detail below.

However, it is also important that the rollover vent valve 10 remain in its normally closed position until the rollover vent valve is severely tilted. The rollover vent valve 10 must not allow air to escape through the vent port 64 when the vehicle in which it is located goes up or down hills or passes over obstructions such as pot holes, bumps, etc. In order to maintain the valve member 38 in the normally closed position, the rollover vent valve 10 uses the radial ribs 62. The radial ribs 62 support the valve member 38 in an upright position as illustrated in FIGS. 4 and 5 until the rollover vent valve 10 is tilted beyond a predetermined angle.

As illustrated in FIG. 5, when in an upright position, the spherical weight 48 and, thus, the valve member 38 are supported on all sides by the ribs 62. Each of the fibs 62 extends through the space between the fibs 83 of the support cage 40 to contact and prevent the spherical weight 48 from causing the cage 40 to move from side to side. Thus, the ribs 62 prevent the cage 40 and, therefore, valve seal 42 from moving off of the valve seat 68 during normal operation of the vehicle.

The ribs 62 continue to support the valve member 38 in the normally closed position until such time as the spherical weight 48 moves upward within the cage 40 as illustrated by arrow 100 in FIG. 5. As the rollover vent valve 10 is tilted to a predetermined angle, the spherical weight 48 rolls upward within the cage. The spherical weight 48 rolls upward within the cage 40 along the inner edge of one or more of the radial support ribs 62. When the spherical weight 48 has rolled upward within the cage 40 to a sufficient degree, it causes the valve member 38 to pivot on one edge of the rounded cylindrical peripheral edge 82 as illustrated by arrow 102 in FIG. 5. The arrow 102 represents an illustrative pivoting of the valve member 38. However, the valve member 38 may pivot in any direction around the rounded cylindrical peripheral edge 82. The weight imbalance caused by the movement of the spherical weight 48 and the pivoting of the valve member on the lower surface of the peripheral edge 82 causes the valve seal 42 to be displaced off of the valve seat 68. As the valve seal 42 is displaced off of the valve seat 68, the pressurized air within the internal pressure chamber 60 and, thus air bag(s) 18, flows freely through the vent port 64, allowing the air bag(s) to deflate.

As the rollover vent valve is tilted to a further degree, the spherical weight contacts the fingers 88. The movement of the spherical weight contacting the fingers 88 places a further weight imbalance on the valve member 38. This weight imbalance causes the valve member 38 to move upward away from the bottom of the internal chamber 60 and valve seat 68 in the direction illustrated by arrow 100. This upward movement of the valve member causes the valve seal 42 to be displaced upward completely off of the valve seat 68.

The angle at which the rollover vent valve 10 moves between its normally closed position and its open position is a function of the design of the ribs 62, the spherical weight 48, the cage 40, etc. In the preferred embodiment, the inner edge 97 (FIG. 5) of each rib 62 slants downward and inward from top to bottom at an angle 98 of approximately 11 degrees. When in its normally closed position, the upper edge 99 of each rib 62 is located slightly above the center of the spherical weight 48. This configuration results in the rollover vent valve 10 moving from its normally closed position to an open position at an angle of approximately 80 degrees.

As the rollover vent valve 10 is tilted further, the spherical weight causes the valve member 38 to move upward away from the bottom of internal chamber 60 as described above.

In alternate embodiments, the angle and height of the ribs 62 could be changed along with the design of the cage 40 and spherical weight 48, etc., to achieve valve opening at other angles. In addition to carefully configuring the rollover vent valve 10 to move between its normally closed and open positions, it is also important to carefully size the spherical weight 48. The weight of the spherical weight 48 must be sufficient to knock the cage 40 and, thus, the valve seal 42 off of the valve seat 68 when the rollover vent valve is tilted beyond a predetermined angle. The weight of the spherical weight 48 required will differ depending upon the shape and design of the cage 40 and housing 30, the pressure within the internal pressure chamber 60 during normal operation of the rollover vent valve, and the venting capacity required.

When the rollover vent valve 10 is in its upright, normally closed position, the pressure within the internal pressure chamber 60 places a downward-directed force on the valve seal 42, thus helping to maintain the valve seal 42 in a dosed position. Thus, the weight of the spherical weight 48 must be sufficient to overcome the weight of the valve member 38, any resistance effects, and the biasing force produced by the pressure within the internal pressure chamber 60.

As discussed above, in addition to being mounted between the control valve 22 and the air bag(s) 18, the rollover vent valve 10 may also be connected directly to the air bag(s) 18 through the use of a separate air line (not shown). In such a configuration, the air line from the air bag(s) can be connected to either the inlet or outlet air fitting 32 or 34. The other air fitting could then be sealed or the housing 30 could be designed with a single inlet. When the rollover vent valve is tilted beyond a predetermined angle, the cage 40 and, thus, valve seal 42 moves off the valve seat 68, thus allowing air within the air bag(s) 18 to flow out through the vent port 64.

The rollover vent valve 10 moves between its normally closed position and its open position when it is tilted or overturned along any axis. Thus, regardless of the dynamics of the rollover accident, the rollover vent valve 10 achieves its intended purpose of venting the air bag(s) 18. The rollover vent valve 10 moves back to its normally closed position when the vehicle in which the rollover vent valve is mounted is tilted back to an upright position. As the vehicle and, thus, the rollover vent valve 10 is tilted back to an upright position, the spherical weight 48 moves downward in a direction opposite that shown by arrow 100 in FIG. 5. As the spherical weight 48 moves downward it moves the cage 40 downward into the conical portion of the internal pressure chamber 60. This downward movement continues until the lower portion 80 of the cage is in place over the valve seat 68, the valve seal 42 is seated on the valve seat 68, and the spherical weight 48 is supported by the ribs 62. Thus, the rollover vent valve 10 may be reused after the truck or other vehicle in which it is mounted is returned to an upright position.

As will be readily appreciated from the foregoing discussion, the invention provides a pressure release mechanism in the form of a rollover vent valve 10 suitable for releasing the air from the air bag or bag(s) of the pneumatic seats of a vehicle in the case of severe tilting or rollover. As a result, the potential for the pneumatic seats to "pin" an injured occupant in an overturned or severely tilted vehicle is reduced.

Although the preferred embodiment of the invention is designed for use in a line extending from the air bag(s), the valve could also be built directly into the control valve 22. Alternately, the rollover vent valve could be built directly into the air bag(s) 18. Hence, it is to be understood that various changes can be made in the disclosed embodiment of the invention without departing from the spirit and scope of the invention as defined by claims below.

The embodiments of the invention in which an exclusive property or privilege is claimed are defined as follows:

1. In a pneumatic seat mounted in a vehicle, said pneumatic seat including at least one air bag and a control valve for controlling the quantity of air in said air bag, the improvement comprising a rollover vent valve coupled to said air bag for venting air from said air bag in the event the vehicle in which the pneumatic seat is mounted is severely titled or overturned, the rollover vent valve including a pressure chamber, a vent port formed in the pressure chamber and a valve member for normally closing the vent port, the valve member including a weight container located within the pressure chamber directly above the vent port when the rollover vent valve is in a normally closed position, a valve seal, and a weight movably mounted within the weight container, the valve seal contacting and sealing the vent port when the rollover vent valve is in the normally closed position and the weight placing a biasing force on the valve seal to maintain the rollover vent valve in the normally closed position when the vehicle is in an upright position, the weight moving within the container when the vehicle is severely tilted to cause the rollover vent valve to move to an open position in which the valve seal moves off of the vent port to open the vent port and allow air to flow out of said air bag.

2. The improvement of claim 1, wherein the weight container includes a plurality of deformable fingers that deform to allow the weight to be removably inserted into the container.

3. The improvement of claim 1, wherein the rollover vent valve further comprises a plurality of ribs extending from a side of the pressure chamber to contact and support the valve member when the rollover vent valve is in the normally closed position.

4. The improvement of claim 1, wherein the interior of the weight container is generally cylindrical and wherein the weight is spherical.

5. The improvement of claim 1, wherein the rollover vent valve moves back to the normally closed position when the pneumatic seat is moved back into an upright position.

6. The improvement of claim 1, wherein the valve member further includes biasing means for biasing the valve seal into contact with a valve seat on the vent port.

7. A pneumatic rollover vent valve for use in a pneumatic seat of a vehicle, the rollover vent valve comprising:

a pressure chamber having an inlet adapted to be connected to at least one air bag on the pneumatic seat and a vent port extending from the pressure chamber to ambient environment;

a valve member having a valve seal located in the pressure chamber, the valve member being movable between a normally closed position in which the valve seal contacts and seals the vent port and an open position in which the valve seal moves off of the vent port to allow air from said air bag to vent out of the pressure chamber, the valve member including a weight cage located within the pressure chamber directly above the vent port, the weight cage containing a weight movably mounted in the weight cage, the weight biasing the valve member into the normally closed position when the rollover vent valve is in an upright position, the weight moving within the weight cage when the rollover vent valve is tilted beyond a predetermined angle to move the valve member from the normally closed position to the open position.

8. The valve of claim 7, wherein the weight cage includes a plurality of deformable fingers that deform to allow the weight to be removably inserted into the weight cage.

9. The valve of claim 7, further comprising a plurality of ribs extending from a side of the pressure chamber to contact and support the valve member in an upright position when the rollover vent valve is in the normally closed position.

10. The valve of claim 7, wherein the interior of the weight cage is generally cylindrical and wherein the weight is spherical.

11. The valve of claim 7, wherein the rollover vent valve moves to the normally closed position when the pneumatic seat is moved back into an upright position.

12. The valve of claim 7, wherein the valve member further includes biasing means for biasing the valve seal into contact with a valve seat on the vent port.

13. A rollover vent valve for use in a pneumatic seat of a vehicle, the rollover vent valve comprising:

a valve housing having an internal pressure chamber, a vent port extending through the valve housing into the pressure chamber, and an inlet port extending into the pressure chamber and adapted to be in fluid connection with at least one air bag of the pneumatic seat;

a valve member located in the pressure chamber, the valve member being movable between a normally closed position when the rollover vent valve is in an upright position and an open position when the rollover vent valve is tilted beyond a predetermined angle, the valve member sealing the vent port when in the normally closed position and allowing air from the pressure chamber to flow out through the vent port when in the open position, the valve member including a weight cage and a weight movably mounted in the weight cage, the weight biasing the valve member into the normally closed position when the rollover vent valve is in an upright position, the weight moving within the weight cage when the rollover vent valve is tilted beyond a predetermined angle to move the valve member from the normally closed position to the open position, the weight moving within the weight cage when the rollover vent valve is moved from the tilted position to an upright position to move the valve member back into the normally closed position when the rollover vent valve is returned to an upright position.

14. The valve of claim 13, wherein the weight cage is mounted within the pressure chamber directly above the vent port.

15. The valve of claim 13, wherein the weight cage includes a plurality of deformable fingers that deform to allow the weight to be removably inserted into the weight cage.

16. The valve of claim 13, wherein the valve housing further comprises a plurality of ribs that extend radially inward from at least one side of the pressure chamber to contact and support the valve member in the normally closed position when the rollover vent valve is in an upright position.

17. The valve of claim 13, wherein the interior of the weight cage is generally cylindrical and wherein the weight is spherical.

18. The valve of claim 13, wherein the valve member further comprises biasing means for biasing a valve seal in the valve member into contact with a valve seat on the valve port when the rollover vent valve is in the upright, normally closed position.

19. In a pneumatic seat mounted in a vehicle, said pneumatic seat including at least one air bag and a control valve for controlling the quantity of air in said air bag, the improvement comprising a rollover vent valve coupled to said air bag for venting air from said air bag in the event the vehicle in which the pneumatic seat is mounted is severely tilted or overturned, the rollover vent valve including a pressure chamber, a port formed in the pressure chamber, a valve member including a weight container having a plurality of deformable fingers, a valve seal, and a weight movably mounted within the plurality of deformable fingers that deform to allow the weight to be movably inserted into the weight container, the valve seal contacting and sealing the vent port when the rollover vent valve is in a normally closed position and the weight placing a biasing force on the valve seal to maintain the rollover vent valve in the normally closed position when the vehicle is in the upright position, the weight moving within the container when the vehicle is severely tilted to cause the rollover vent valve to move to an open position in which the valve seal moves off of the vent port to open the vent port and allow air to flow out of said air bag.

20. A pneumatic rollover vent valve for use in a pneumatic seat of a vehicle, the rollover vent valve comprising:

a pressure chamber having an inlet adapted to be connected to at least one air bag on the pneumatic seat and a vent port extending from the pressure chamber to ambient environment;

a valve member having a valve seal located in the pressure chamber, the valve member being movable between a normally closed position in which the valve seal contacts and seals the vent port, and an open position in which the valve seal moves off of the vent port to allow air from said air bag to vent out of the pressure chamber, the valve member including a weight cage having a plurality of deformable fingers that deform to allow a weight to be removably inserted into the weight cage so that the weight may move within the weight cage, the weight biasing the valve member into the normally closed position when the rollover vent valve is in the upright position, the weight moving within the weight cage when the rollover vent valve is tilted beyond a predetermined angle to move the valve member from the normally closed position to the open position.

21. A pneumatic rollover vent valve for use in a pneumatic seat of a vehicle, the rollover vent valve comprising:

a pressure chamber having an inlet adapted to be connected to at least one air bag on the pneumatic seat and a vent port extending from the pressure chamber to ambient environment;

a valve member having a valve seal located in the pressure chamber, the valve member being movable between a normally closed position in which the valve seal contacts and seals the vent port and an open position in which the valve seat moves off of the vent port to allow air from said air bag to vent out of the pressure chamber, the valve member including a weight cage that contains a weight movably mounted in the weight cage, the weight biasing the valve member into the normally closed position when the rollover vent valve is in the upright position, the weight moving within the weight cage when the rollover vent valve is tilted beyond a predetermined angle to move the vent valve member from the normally closed position to the open position, the pressure chamber including a plurality of ribs extending from at least one side of the pressure chamber to contact and support the valve member in an upright position when the rollover vent valve is in the normally closed position.

* * * * *